United States Patent [19]
Soto

[11] 4,202,423
[45] May 13, 1980

[54] LAND VEHICLE WITH ARTICULATED LEGS

[76] Inventor: Jose M. Soto, P.O. Box 783, S. Lancaster, Mass. 01561

[21] Appl. No.: 898,457

[22] Filed: Apr. 20, 1978

[51] Int. Cl.² .............................................. B62D 57/02
[52] U.S. Cl. .................................... 180/8 D; 364/424
[58] Field of Search ................. 180/8 D, 8 E, 8 R, 4; 305/1, 3; 280/6.1; 364/424

[56] References Cited

U.S. PATENT DOCUMENTS

| | | | |
|---|---|---|---|
| 2,942,676 | 6/1960 | Kraus | 180/8 D |
| 3,881,736 | 5/1975 | Wilfert | 280/6.1 |

OTHER PUBLICATIONS

*Electrohydraulic Servos Control Walking Machine,* Hydraulics & Pneumatics, Aug. 1970, pp. 63–65.

*Primary Examiner*—John A. Pekar
*Attorney, Agent, or Firm*—Richard L. Stevens

[57] ABSTRACT

A vehicle with articulated legs is provided for movement across a surface or through water. Each of the legs is adapted to move in at least two planes with reference to vehicle balance. The movement of the legs is controlled sequentially to effect movement over an uneven surface while maintaining the vehicle balance.

24 Claims, 22 Drawing Figures h is constant a ⇒ same
h ⇒ reduced h = further reduced    FIG. 10b h set by routine
a = h/2 a = 0

LAND VEHICLE WITH ARTICULATED LEGS

BACKGROUND AND BRIEF SUMMARY OF THE INVENTION

This invention relates to land or amphibious vehicles with articulated legs. Prior art vehicles, especially those adapted for moving over rough or uneven terrain have been proposed. Typically these vehicles employ telescopic legs pivotally secured to a body or segmental legs adapted for limited oscillatory movement in one or more fixed planes. These prior art vehicles are generally subject to the problems of both lack of flexibility of movement of the vehicle per se in several directions such as forward, reverse, banking and rotatable movement; and the inability to control the movement of all legs substantially simultaneously. In this latter situation the legs are not all controlled substantially simultaneously such as when moving over rough terrain, the vehicle moves slowly and awkwardly.

My invention is directed to a vehicle with articulated legs and a method of operating the same, which vehicle can travel over rough terrain at high speeds.

My invention broadly comprises a vehicle and a method of operating the same; which vehicle has a plurality of articulated legs. Each of the legs is adapted to move in a plurality of planes. A level sensor is provided to ascertain the plane of the vehicle in reference to the horizontal. The legs and level sensor communicate both with a control module and a power source.

The power source provides the drive for the movement of the legs and the legs in turn control the movement and plane of the vehicle.

The control module includes a computer with associated interface equipment. The computer is programmed particularly for operation of the vehicle. The computer senses commands such as direction and speed of movement, the present position of the legs, the movements which each of the legs must effect to respond to the direction and speed input signal, and lastly transmits the proper communications to the legs whereby the desired movement is effected.

In a preferred embodiment of the invention the legs are pivotally secured to the vehicle at one end and contact the surface at another end. Further the legs are comprised of at least two linkages and the legs are controlled by determining the angular relationship of the linkages in reference to the vertical and the horizontal.

In the preferred embodiment six legs are used; each leg having an upper link and a lower link. The vehicle may move through six basic movements: rotation around a Z-axis, which axis passes vertically through the vehicle; forward or reverse movement along a Y-axis, which axis is perpendicular to the Z-axis; lateral movement along an X-axis which X-axis is perpendicular to both the Y and Z axes; upward and downward movement along the Z-axis; rotary movement about the Y-axis; and rotary movement about the X-axis or any combination thereof.

The legs are moved through an increment or distance delta a ($\Delta a$) with a variable height (h) which in combination with the distance traveled ($a + \Delta a$) allows control of the legs.

At least three basic angles are defined, from which angles the necessary calculations are made: angle A ($\angle A$), preferably an acute angle, between the longitudinal axes of the upper and lower links, angle B ($\angle B$), preferably an acute angle, between the horizontal plane of the vehicle and the longitudinal axis of the upper link; and angle C ($\angle C$), preferably less than 180°, between the plane of the vehicle and the plane within which both links like.

The means to sense the plane of the vehicle comprises a gimbal-pendulum arrangement wherein the pitch, roll and/or yawl of the vehicle may be sensed. Each leg is controlled by a computer. The computer reads the desired speed and direction from a control stick and a control wheel. Each actual leg position is read by a sensor which reads angular position, and the level position of the vehicle is read by sensors associated with the gimbal-pendulum arrangement. These control signals and position sense signals are read by the computer and the computer controls the leg movements following the preestablished programs in the computer memory.

The machine can move in any direction, such as in a circle, forward, sideways or at any angle, can turn about its center axis (Z), can turn and move in any plane, and can change its level and can bank while turning.

My invention broadly comprises a vehicle adapted for use on land or sea which includes a housing having a longitudinal axis Y, a transverse axis X, and a vertical axis Z, the axes being mutually perpendicular one to the other. A plurality of articulated legs are secured to and extending downwardly from the housing, the legs each comprising an upper link and a lower link. The upper link is joined to the housing and to the lower link. The longitudinal axes of the links intersect and define an angle A. The longitudinal axis of the upper link is adapted for movement in at least two planes through two angles. A first plane parallel to the Y and Z axes and through an angle B, and a second plane parallel to the X and Z axes and through an angle C. The movement in said planes results in a substantially cone-shaped region. The legs are in communication with a drive means and also with a control means. The legs are responsive to the control means and the drive means to move through at least one of the three angles.

BRIEF DESCRIPTION OF THE DRAWINGS

FIGS. 10a and 10b are schematics of one leg during trace and retrace cycles;

DESCRIPTION OF THE PREFERRED EMBODIMENTS

Figure 1:
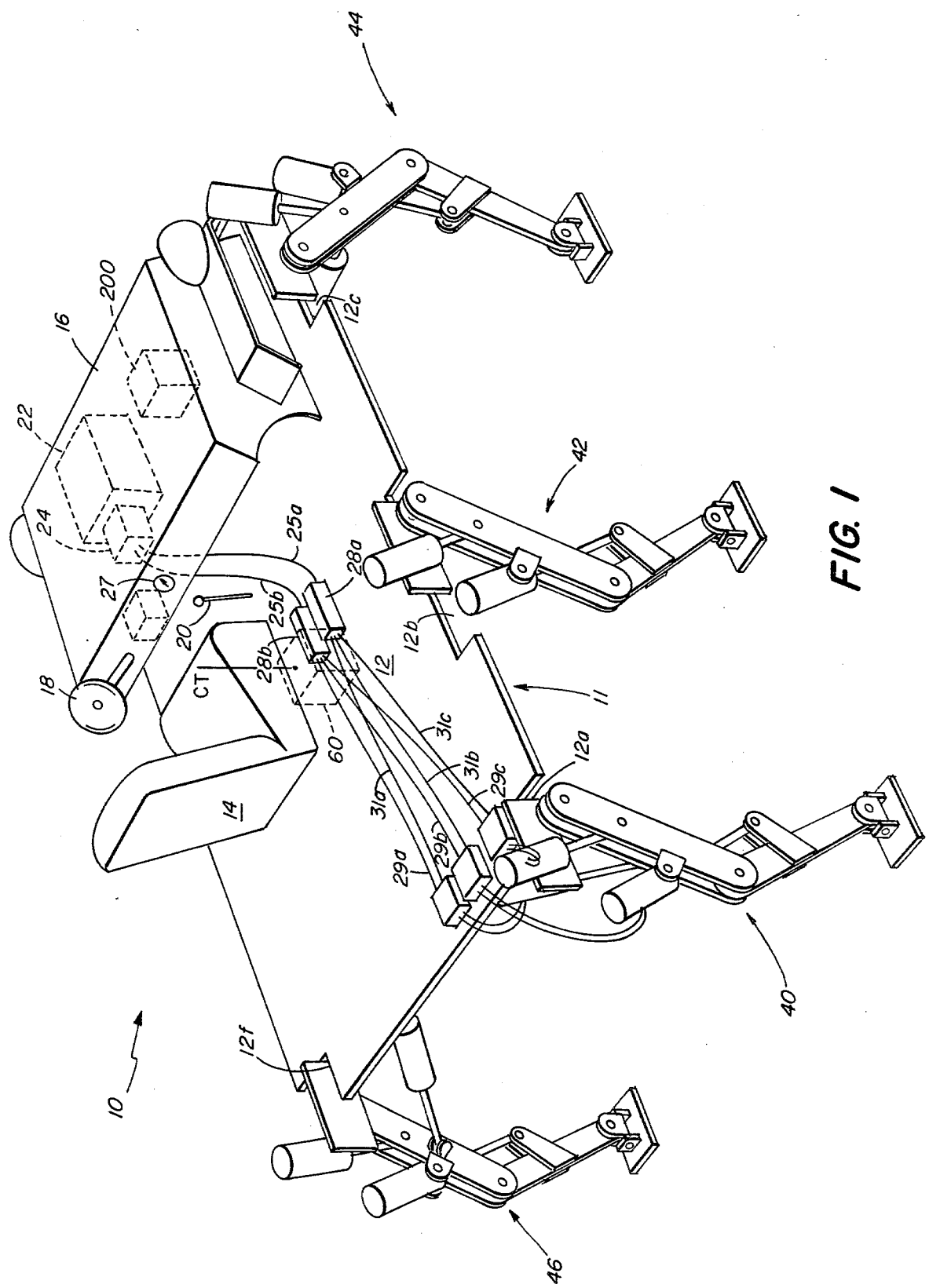
FIG. 1 is a perspective view of a land vehicle with articulated legs embodying my invention.

Referring to FIG. 1, a land vehicle with articulated legs is shown generally at 10 and it comprises a body 11 including a platform 12 to which is secured a seat 14, a forward housing 16 through which passes a control wheel (steering wheel) 18. A control stick 20 is secured to the platform 12. Enclosed within the housing 16 is an engine 22, such as a General Motors 4 cylinder 200 horsepower engine.

A computer 200 with associated interface equipment (FIG. 20), a variable delivery oil pump 24 and a gimbal-pendulum arrangement 60 (FIG. 8) are also disposed in the housing 16.

The engine 22 is standard and includes a speed governor to maintain a constant rpm. The oil pump 24 is a constant pressure variable delivery bypass type. When a demand is placed on the pump 24 to maintain constant pressure the load is transferred to the engine 22. Because of the governor the engine will maintain constant speed. This particular concept is well known in the art and need not be described in detail. Further for this same reason the engine components such as coils, fuel supply, ignition, etc. have not been shown in detail.

The variable oil pump 24 is geared to the engine 22. A pump such as an ABEX DENISON Series 2-700 may be used. The pump includes an output hose 25a and an input hose 25b. Hoses such as Parker 34 Series (SA-E100R9 Type AT) are suitable. As will be described, eighteen four-way solenoid valves are used, three for each of the six legs. Thus the input and output hoses 25a and 25b branch to include eighteen output conduits 29a through 29r and eighteen input conduits 31a through 31r, two pairs to each of the solenoid valves. For purposes of clarity not all of these lines are shown. Two bladder type accumulators 28a and 28b such as Parker Type MS-28700-4 are placed in the input and output hoses 25a and 25b between the pump 24 and where the hoses 25a and 25b branch to form conduits. The accumulators 28 eliminate or reduce the standing wave ratio (reflection) problem created when solenoid valves are opened and closed at a high rate.

Each pair of input/output conduits 29a-31a, 29b-31b, etc., are hydraulically secured to a solenoid valve. In this embodiment there are eighteen solenoid valves, three for each leg.

For the purposes of clarity only three solenoid valves with associated cylinders will be described in detail. It is to be understood that although only one leg will be described in detail that each leg of the vehicle 10 functions mechanically and hydraulically in the same manner.

There are six legs 40, 42, 44, 46, 48 and 50: legs 40, 44, 46 and 50 at corners of the platform 12; and legs 42 and 48 secured to the platform 12 at the sides thereof, intermediate the legs 40 and 44; and 46 and 50 respectively. One of these legs with its associated cylinders and solenoid valves is shown more clearly in FIGS. 5, 6 and 7. A gimbal-pendulum level sensor 60 is shown schematically in FIG. 1 and in greater detail in FIG. 8. This gimbal-pendulum level sensor 60 is positioned in the center of the vehicle 12, such that when the Z axis of the vehicle (or CT axis, see FIG. 4) passes therethrough.

Each of the total leg assemblies being identical only one will be described in detail namely the leg 40.

Figure 5:
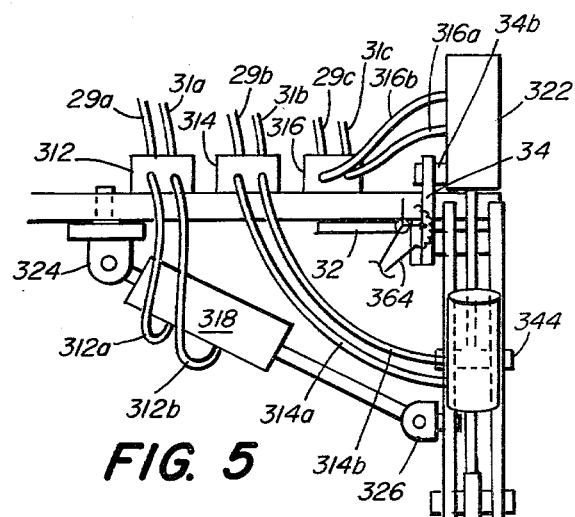
FIG. 5 is a front view of an articulated leg of FIG. 1.

Referring to FIG. 5, secured below the platform 12 adjacent the cut-out portion 12a is a hinge 32. A support plate 34 is secured to the hinge 32. As will appear this allows movement of the leg 40 through ∠C.

The leg 40 comprises an upper link 300 and a lower link 302. Relative movement of the links, one to the other, is through ∠A. Movement of the link 300 to the platform is through ∠B. The upper link includes two parallel supports 306 and 308 rotatably pinned at their one or upper ends to the plate 34 and pinned at their other or lower ends to the one or upper end of the lower link 302. At the other or lower end of the lower link 304 is a rectangular shaped foot 310 pinned thereto for movement in two planes.

A plurality of solenoids 312, 314 and 316 are secured to the top surface of the platform 10. Each of the solenoids includes paired lines 312a, 312b; 314a, 314b; and 316a, 316b; and output lines 312b, 314b and 316b are connected respectively to cylinders 318, 320 and 322. The input and output conduits 29 and 31 are connected to the accumulators 28 and thus to pump 24. The solenoids also are electrically responsive to the computer 200.

Figure 7:
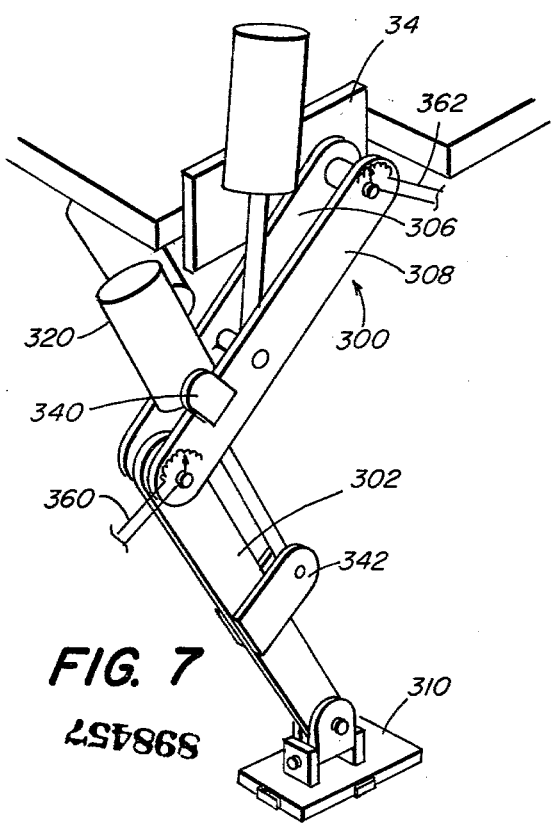
FIG. 7 is a perspective view of the leg of FIG. 5.

As shown most clearly in FIGS. 5 and 7, the cylinder 318 which effects the lateral movement (∠C) of the leg 40 is rotatably pinned at one end between the arms of a U-shaped plate 324 which plate is rotatably secured to the underside of the platform 12. The end of the piston rod of the cylinder 318 is secured at its other end to the upper linkage 302. More specifically, the other end is rotatably pinned between the arms of a U-shaped plate 326, which plate is rotatably secured to the support 306 of the link 300. If desired ball and socket joints could be used in place of the U-shaped support plates.

The cylinder 320 in its upper portion has extending pins. Arms 340 are secured to the supports 306 and 308. The pins are rotatably received in the arms 340 securing the cylinder 320 therein. The lower link 302 has extending arms 342. The end of the piston rod of the cylinder 320 is rotatably secured to the arms 342. The cylinder 320 controls the ∠A.

The end of the piston rod of the cylinder 322 is characterized by an extending pin 344 which is rotatably received in the supports 306 and 308. The cylinder 322 is rotatably secured to the plate 34 by an arm 346. Preferably the arm is welded to the cylinder 322 and journaled in the plate 32. The cylinder 322 controls the ∠B.

As shown in FIGS. 5 and 7, cylinders 318, 320 and 322 have associated solenoid valves 312, 314 and 316 with paired lines 312a, 312b, etc., to the cylinders and input conduits and output conduits 29-31, etc. to the main oil pump.

The specific arrangement of cylinders, solenoid valves, lines, conduits, linkages, pins, braces, etc., are illustrative of the preferred embodiment of this invention. Other variations of mechanical and hydraulic configurations will be apparent to those skilled in the art in which one effects the movement of the leg 40 through an ∠C through an ∠B, and through an ∠A, these movements ocurring solely or in any combination thereof. Alternatively all connections between links, the upper link to the platform, the foot to the lower link, and the securing of the pistons to the links and to the vehicle could be achieved through ball and socket joints.

Sensors of the type used for the gimbal-pendulum level sensor measure the angles A, B and C. A sensor 360 measures ∠A, a sensor 362 measures ∠B and a sensor 364 measures ∠C. The sensors are shown schematically in FIG. 5 and may be secured in any suitable manner. Further they are responsive to the computer 200. The sensors, as will be described, may either by optical encoders or potentiometers. The sensors are calibrated and scaled to provide an output signal, such as voltage.

Figure 2:
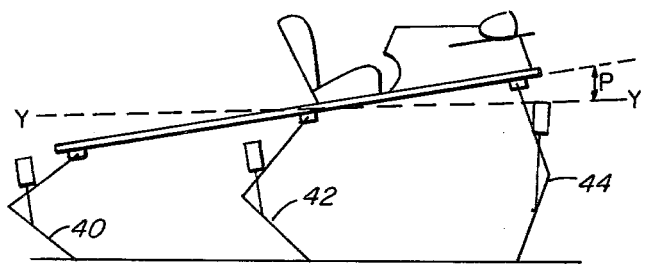
FIG. 2 is a side schematic illustrating my invention.
Figure 3:
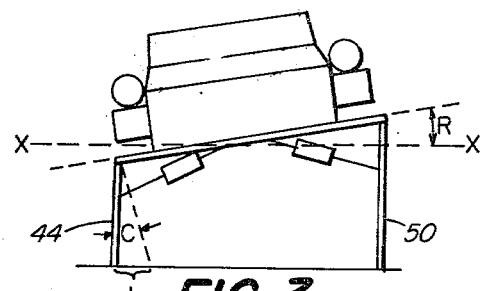
FIG. 3 is a front view of FIG. 2.

FIG. 2 is a side schematic view of the vehicle 10 illustrating the X, Y and Z axes of the vehicle. FIGS. 3 and 4 are front and top views of FIG. 2 also illustrating the same axes as well as associated angles as will be referred to in the description of the operation of the invention.

Figure 8A:
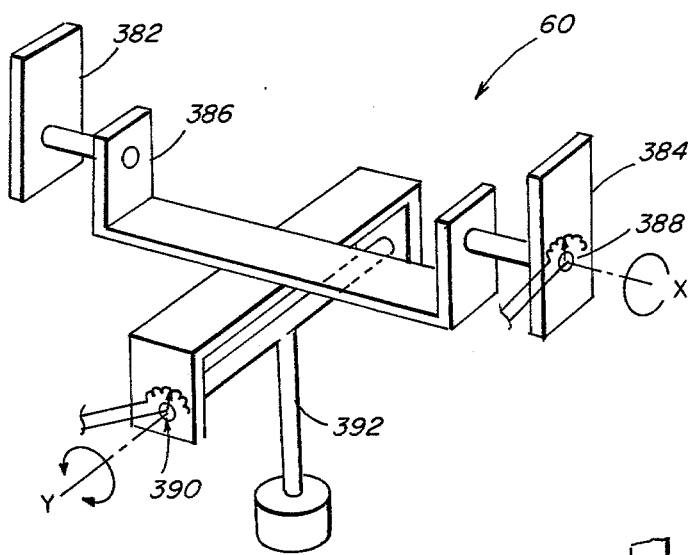
FIG. 8a is a perspective illustration of a gimbal-pendulum arrangement.

The gimbal-pendulum level sensor 60 which is shown generally in FIG. 1, is shown in perspective illustration in FIG. 8a and comprises two depending support plates 382 and 384 secured to the platform and extending downwardly from the bottom surface thereof. A gimbal 386 is journalled to the lower ends of these supports 382 and 384. A sensor 388 such as a rheostat or an optical encoder monitors movement about the X axis and a sensor 390 such as a rheostat or an optical encoder monitors movement about the Y axis. A pendulum 392 extends from the lower portion of the gimbal. Both sensors communicate with the computer 200. A height switch 27 is on the front panel. The switch 27 is a potentiometer which ranges from OFF at 1.2 volts to full at 0.3 volts output. At OFF level platform 12 is 60 inches from ground; at full level platform 12 is 15 inches from ground. It establishes a desired height of the vehicle 10 when level.

Figure 8B:
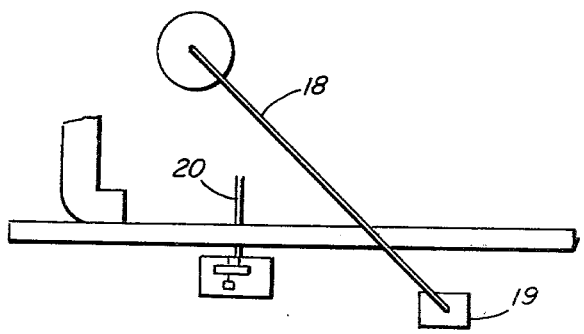
FIG. 8b is a side view of the control wheel and the control stick.

The control wheel 18 is connected to a shaft as shown in FIG. 8b. At the end of the shaft there is a wheel position sensing device 19 such as a potentiometer or an optical encoder. When the wheel is moved the sensor is moved by the shaft and its change in position generates a corresponding change in electrical signal. This signal is input into the computer 200. The computer converts this information to the desired turning ratio to complete the control of the leg movement.

The control stick 20 is movably secured to the platform and to a position sensing device 21. This device 21 is a gimbal arrangement identical to the type remote control unit for a hobbyist's airplane. Two sensors for the X and Y axes such as potentiometers or optical encoders are used as with the gimbal 60. When in a neutral position the output to the computer 200 indicates no movement. As will be described in the operation of the invention, when the stick 20 is moved forward to the rear or to the side then of course the optical encoders or rheostat provide signals to the computer 200 indicating the amounts of movement that are required for each leg. The sensors of the preferred embodiment are potentiometers such as Allen Bradley type GAIN05bS hot molded composite potentiometer-linear taper. Optical encoders such as available from Dynamic Research Corporation or other sensors may be used. Each leg has three sensors. For leg 40, FIGS. 5, 6 and 7, the potentiometers are shown schematically. All legs being identical, the remaining legs 42, 44, 46, 48 and 50, each have three sensors for a total of eighteen sensors from the six legs.

The gimbal-pendulum level sensor 60 has two sensors, both potentiometers shown schematically in FIG. 8a. The control wheel 18 has a sensor 18 which is a potentiometer.

The control stick 20 has two sensors; potentiometers to measure changes from level along the X axis and Y axis. The height switch 27 has a potentiometer. In all there are twenty-four sensors which communicate with the computer 200 in reference to position.

These sensors are potentiometers. Alternatively optical encoders could be used. With the potentiometers the scales for all sensors are as follows:

1. Electrical signal 0 volts to 5.12 volts dc equivalent to 256 decimal divisions or one 8 BITS BYTE. This means that 1 bit is equal to 20 mV.

2. One BYTE equal to two Radians or 114.6 degrees.

3. When the control stick 20, control wheel 18 and sensor 60 are neutral 2.56 volts are output from all associated sensors. When the angles A, B and C are each half-way between a fully extended and fully retracted position the output is 2.56 volts. The height switch has a range from 0.3 volts to 1.2 volts.

In other words, when any of the angles, A, B and/or C, are one-half range, this equals one radian; when full range this equals two radians and where zero range, this equals zero radians.

The analog to digital converter changes these signals to 128 decimal. The computer substracts 128 decimal from any reading received such that it is a conversion from; 0 to 5.12 VDC =0 to 256 decimal, to; 0–5.12 VDC= −128 to 128.

An optical encoder if used is scaled in the same way (1 radian equal to 128 division). In this instance the signal would go digitally directly from the optical encoder to the computer interface.

4. Each bit represents 1 inch in linear movement.

If we move the control stick full forward or one radian (57.3 degrees) we are going to read 128 decimal (or 128 inches per computer loop per second, this means 12.66 feet per loop, there are five of these loops per second). Full speed means 63.33 feet per second or approximately 43.18 mph. In actuality full speed will be somewhat less than this because of hydraulic shock waves.

Routine DELTA step 11 limits forward speed, step 20 limits backward speed. (The example of this application is limited to 10 units or 50 inches/sec., equivalent to 3 mph.)

Summary:
Scales—
   1 bit=1 inch
   1 bit=0.055 radian=20 mv
   1 BYTE=2 radians
   1 Radian=2.56 volt=57.2 degrees.
Those scales apply to all sensors and all controls.

The Computer

Figure 20:
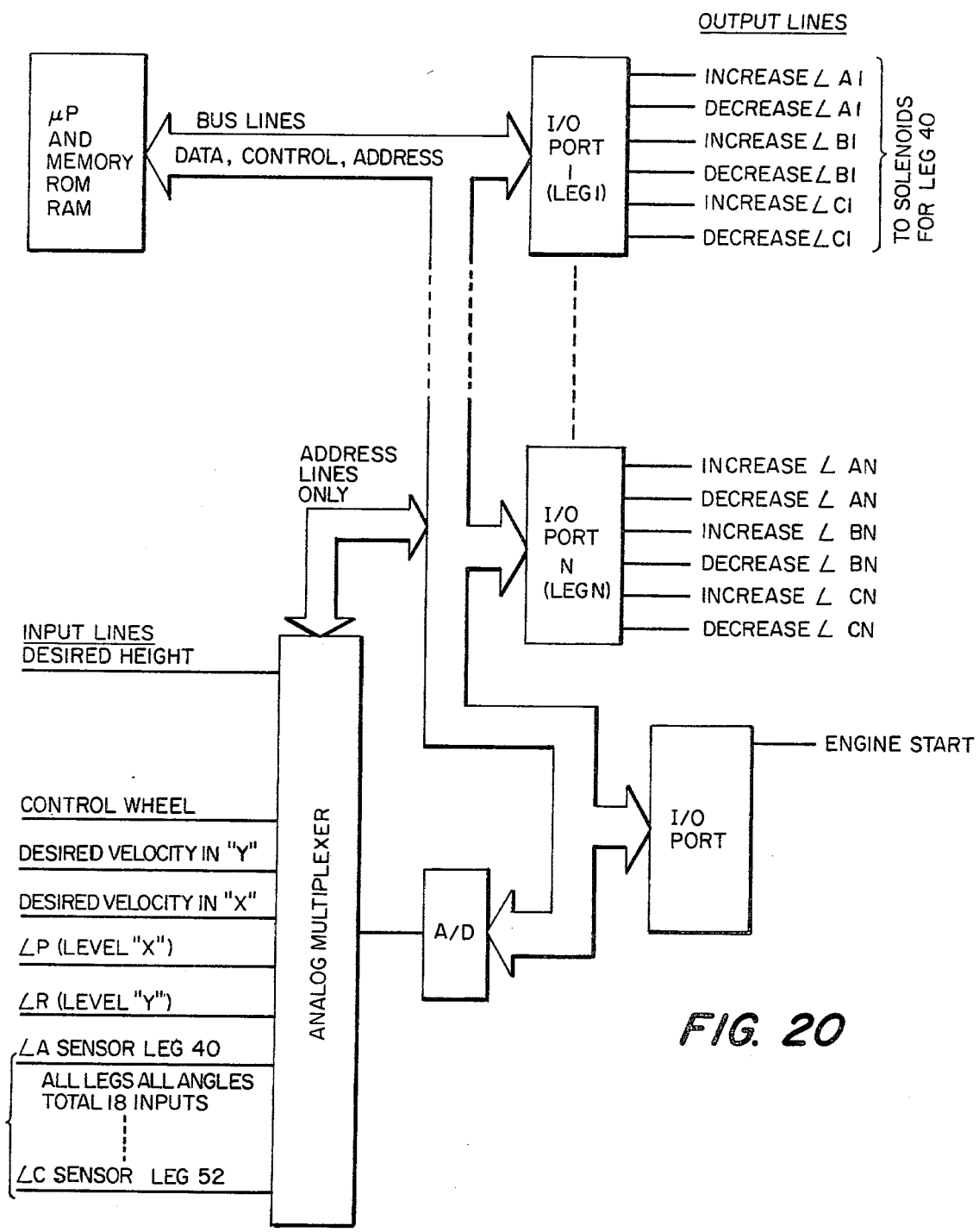

An electrical functional block diagram of the computer 200 is shown in FIG. 20. The computer 200 used in the preferred embodiment is a microprocessor such as an 8085 miniprocessor available from Intel Corporation Santa Clara, Calif. Two interfaces for input, output and random access memory such as Intel's 8155 was used; and two interfaces for input, output and programmable read only memories such as Intel's 8755 are also used. Components are connected according to a standard system configuration such as found in the manual published by Intel Corporation, MC5–85 User manual, Appendix 1, pages A1—1 through A1-5; and FIG. 3 which manual is hereby incorporated in this application in its entirety. Three single chip data acquisitions systems such as National Semiconductors adc0816 are connected to the interface, and the address lines of the data acquisition systems are connected also to the address lines to the computer and the 8205 selection Ic's in the computer. Reference to FIG. 20 will show all inputs to and from the computer.

The control of the computer is accomplished through the instructions. The instructions are written in terms of the particular mode of operation desired. The computer 200 thus has stored in its memory the programs and routines corresponding to each mode of operation.

As is well known to those skilled in the art the computer comprises suitable control, storage and computational units for performing various arithmetic functions on data which is presented in digital form. Any standard computer language consistent with the capability of the computer can be used for the instructions. All sub-routines are not described in detail since they can be written upon a particular computer being utilized, the computer language, etc. Programs and instructions described below are put in terms of structural flow. When necessary and applicable for purposes of the invention, the individual programs are described.

All controls initiate and return to and from the main program depending upon the mode of operation.

In the main program the first fifteen steps typically comprise the main loop. Within the main loop, as is understood in computer programming there may be one or more sub-loops. In this invention for the preferred embodiment, there are six such sub-loops. Each of the six legs is handled sequentially. When the pointer is set to 1 for leg loop 1 NN=1 then all various sub-routines, etc. are completed for leg 1. At its completion then the pointer is set to 2 for leg loop 2 and so on until the completion of leg loop 6.

In the discussion of the programs for this embodiment the following sets forth the relationship between the computer language and the legs.

3/17/78

| | | |
|---|---|---|
| NN=1 | Leg 50 | Leg 1 Loop |
| NN=2 | Leg 48 | Leg 2 Loop |
| NN=3 | Leg 46 | Leg 3 Loop |
| NN=4 | Leg 44 | Leg 4 Loop |
| NN=5 | Leg 42 | Leg 5 Loop |
| NN=6 | Leg 40 | Leg 6 Loop |

Main Program

| | |
|---|---|
| 1 - CALL CLEAN SUBROUTINE (SUB) | Clear the memory; set the stack pointer and start engine. |
| 2 - SET LEG POINT "NN | This sets the pointer to 1 for the leg 1 loop. NN will be equal to 1 and all following routines will operate in leg NN until NN is changed to 2, 3 ...6. Then it goes back to 1 again. |
| 3 - CALL DIAGNOSTIC SUB | This sets a flag in a selected I/O port and checks if the computer is clear. |
| 4 - CALL SET h SUB | This levels the vehicle. |
| 5 - CALL DELTA SUB | This calculates the required delta "a" and delta "d' for direction and movement. |

| | |
|---|---|
| 6 - IF 'Delta d" GREATER THAN 24 DECIMAL JUMP TO "RETRO" | This instruction checks the 'd' limit of the actual leg and sets this leg to retrace if greater than 24 decimal (24 inches because 1 bit is equal to 1 inch). If delta d is smaller than 24, program continues. |
| 7 - IF REVERSE FLAG SET JUMP TO SORT 1 MACRO | This checks for reverse. If reverse flag is not set it will continue to the next step. |
| 8 - SORT 2 MACRO | This step is executed if the unit is to move forward in response to control stick 20. Legs 40 and 46 move in an opposite direction from legs 42, 44, 48 and 50. This selects between the two legs RETRACE START POINT SMALL h and BIG h. LEGS 42, 44, 48 and 50 will JUMP to sub-routine SMALL h, LEGS 40 and 46 will JUMP TO sub-routine BIG h. |
| 9 - SORT 1 MACRO | This functions as SORT 2 MACRO when the vehicle is in REVERSE. It selects in the following way: LEG 44 and 50 JUMP TO BIG h and LEG 40, 42, 46 and 48 JUMP TO SMALL h. |
| 10 - SMALL h | This routine checks the value of "a" for each specific leg if the leg loop is greater than its "h" value divided by two. If $a_n$ (n=1, 2 ...6) IS BIGGER THAN |

| | |
|---|---|
| 11 - BIG h | $h_n/2$ JUMP TO "RETRO". If $a_n$ IS NOT BIGGER THAN $h_n/2$ JUMP TO "RET". This is the same as SMALL h but checks if the value of "$a_n$" is equal to "$h_n$". n is equal to the actual leg number NN (nn=40, 42 ... 50). If "$a_n$" BIGGER THAN "$h_n$" JUMP TO "RETRO". IF SMALLER JUMP TO "RET". |
| 12 - RET | Checks if the RETRACE FLAG is set. This is done because the h value is changed during the RETRACE cycle and the relation between "a" value and "h" could be changed. This routine also ensures the leg loop continues throughout the RETRO routine. Upon completion of the RETRO routine reset the RETRACE flag. JUMP TO "RETRO" IF THE LEG RETRACE FLAG IS SET. IF NOT JUMP TO "CONTROL". |
| 13 - CALL "RETRO" SUB | |
| 14 - CALL "CONTROL" SUB | |
| 15 - INCREMENT "NN" | Increment leg pointer in order to start everything for next leg movement. |
| 16 - IF NN EQUAL 6 | JUMP TO DIAGNOSTIC (Item 3 of MONITOR section). IF NOT CONTINUE. |
| 17 - IF ON SWITCH | SET JUMP TO "SET NN = 1". (Item 2 of this monitor.) IF NOT SET CONTINUE. |

| | |
|---|---|
| 18 - "STOP" | This reduces speed until brake turns the engine off and set-up start conditions. |

SET h (Sub-routine)

Figure 4:
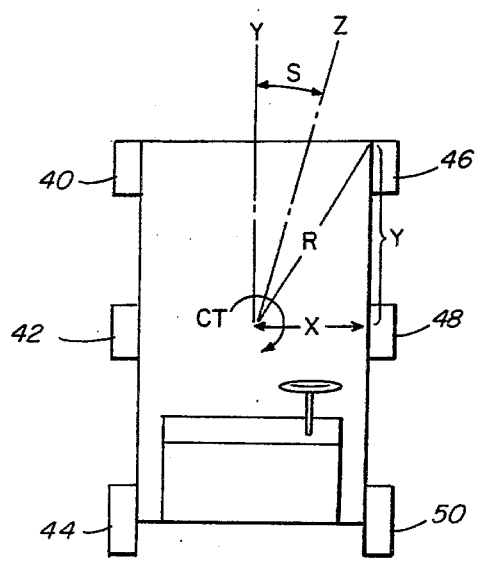
FIG. 4 is a top view of FIG. 2.

(Figures 2, 3 and 4)

This levels the vehicle. In this sub "angle X" is equal to the opposite of "Angle R" or X = -R.

| | |
|---|---|
| 1 - CALL LIMIT SUB | This checks that all legs are within the height range. |
| 2 - IF X EQUAL TO 0 JUMP TO "YEQ0" | (Step 12) |
| 3 - IF X IS NOT GREATER THAN 0 JUMP TO "INCH 46" | (step 8) |
| 4 - INCREMENT h1 and h3 | This increases the height of leg 50 and leg 46 if angle X is bigger than 0 (angle R negative) in order to reduce angle X and level of the vehicle in the X angle. |
| 5 - IF X IS NOT GREATER THAN 2 BITS JUMP TO "YEQ0" | (Step 12) |
| 6 - DECREMENT h4 and h6 | Decrement the height of leg 44 and leg 40 to level the vehicle. |
| 7 - JUMP TO "YEQ0" | Uncondition JUMP. |
| 8 - INCH 46 | This increments h4 (leg 44) and h6 (leg 40) and/or decrements h1 (leg 50) and h1 (leg 46) to achieve balance. |
| 9 - IF X IS NOT LESS THAN MINUS 2 BITS JUMP TO "UEQ0" | (Step 12) |

10 - DECREMENT h1 and h3    This achieves the same balance effect as step 8 (increments legs 44 and 40).

11 - JUMP TO YEQ0

12 - YEQ0    If Y = 0 continue. If not go to "Y MAX 0".

13 - IF LEG 48 GROUND SWITCH SENSED GO TO "PAT 5 SW"

(Step 16) This checks if the leg is already on ground.

14 - IF LEG 48 IN RETRACE TO TO "PAT5SW"

(Step 16) Skip next step.

15 - INCREMENT h2

16 - PAT5SW    IF LEG 42 GROUND SWITCH SENSED GO TO "HCONT"

17 - IF LEG 42 IN RETRACE GO TO "H CONT"

(Step 19) Same as step 14 but with H5.

18 - INCREMENT h5

19 - HCONT    RETURN FROM SUB IF "HEIGHT CONTROL SW IS OFF. This switch 27 is in the control panel, is connected to an I/O port of the A/D MULTIPLEXOR CONVERTER (a National ADC0816 is used) and selects the machine's desired height.

20 - RETURN FROM SUB, IF AVERAGE EQUAL TO DESIGNED h

The average is calculated here from the actual h value. The desired height is read from the potentiometer of the control switch 27.

21 - JUMP TO "INHTO" IF h AVERAGE LESS THAN h DESIRED

22 - DECREMENT ALL H VALUES AND RETURN

>This reduces the average h by 1 bit or all h by 1 bit.

23 - INHTO  INCREMENT ALL H VALUES.

24 - UNCONDITIONAL RETURN

25 - INCH 14  INCREMENT h1 (leg 50) and h4 (leg 44). This balances the "Y" axis in the same way that the "X" axis was balanced.

26 - IF Y IS NOT LESS THAN MINUS 2 BITS JUMP TO "HCONT"

27 - DECREMENT h3 (leg 46) and h6 (leg 40)

28 - JUMP TO "HCONT"

29 - "YMAX0"  IF Y IS NOT GREATER THAN 0 GO TO "INCH 14" (Step 24).

30 - INCREMENT h3 (leg 46) and h6 (leg 40)

31 - IF Y IS NOT GREATER THAN 2BITS JUMP TO "HCONT" (Step 18)

32 - DEC H1 (leg 50) and H4 (leg 44)

>The decrement of H1 and H4 lowers the front end of the unit. The increment of H3 and H6 raises the back of the unit.

33 - JUMP TO "HCONT"  (Step 19)

Limit Sub-Routine

1 - LIMIT SUB - SET N = 0  Temporary leg pointer to scan the h level condition in each leg. This does not affect NN leg pointer.

2 - MMFLAG  INCREMENT N

This temporary pointer looks at leg 1, h1 level.

3 - IF h,N MIN SET MIN FLAG

4 - IF h,N MAX THEN SET MAX FLAG

5 - IF N NOT EQUAL TO 6 JUMP "MMFLAG" (Step 2)

| | |
|---|---|
| 6 - IF MIN FLAG SET IN STEP 3 JUMP "MAXFLA" | |
| 7 - IF MAX FLAG SET IN STEP 4 JUMP TO "SETN0" | |
| 8 - RESET | RESET MIN MAX FLAG |
| 9 - RETURN | |
| 10 - SETN0 | SET N=0 Temporary let pointer set like step 1. |
| 11 - INCH 1 | INCREMENT N |
| 12 - DECREMENT h,N | This decrement h,N (N=1, 2 ...6). All legs are decremented if any one is over the height limit. The balance is helped because all are decremented by one bit or one inch. Every time that the leg pointer N is incremented, the corresponding h is decremented, one at a time in turn and every one of this six secondaries loop. |
| 13 - IF N IS NOT EQUAL TO 6 JUMP TO "INCH 1" (Step 11) | |
| 14 - JUMP TO "RESET" (Step 8) | |
| 15 - MAXFLA | IF MAX FLAG SET CALL "STOP SUB" This maximum limit flag is checked here after the minimum flag is checked. This means that both max and min are set or one leg is at maximum height and the other is at minimum and the machine is in a slope greater than what is designed for. |
| 16 - SET n=0 | |
| 17 - INCH2 | INCREMENT N |

18 - INCREMENT H,N          This is the same as step 12 but increment instead of decrement 20 - IF N IS NOT EQUAL TO 6 JUMP TO "INCH2" (Step 17)

21 - JUMP TO "RESET" (Step 8)

Control Sub-Routine

This routine sends the signal to operate the solenoid values for the cylinders.

This routine is detailed for angle A. The same routine is used for angle B and angle C for each leg but such routines are not set forth in detail to avoid redundancy.

1 - CONTRO                  Sub-routine for ANGLE A

2 - CALL CALC               This routine uses the values in the DELTA routine and performs the needed calculations for the desired angle A, angle B and angle C.

3 - SUBTRACT ANG A ACTUAL FROM ANG A DESIRED

4 - IF EQUAL GO TO "CONTA" (Step 8)

5 - IF ANG A ACT BIGGER THAN ANG A DES GO TO "INA" (Step 10)

6 - OPEN THE SOLENOID VALVE THAT DECREASE ANG A ACT

This signal goes to an I/O PORT. It is amplified and then sent to a solenoid valve that allows the fluid power to operate a cylinder.

7 - RETURN

8 - "CONTA"-RESET I/O       Reset the I/O Port such that no increase of angle A and no decrease of angle A occur. This step sends a closed signal for both valves for the leg and the angle handled at this time.

9 - GO TO RETURN (Step 7).

10 - "INA" - OPEN THE SOLENOID VALVE THAT INCREASE ANG A ACT

> This signal goes to an I/O PORT. It is amplified and then sent to a solenoid valve that allows the fluid power to operate a cylinder that increases angle A.

11 - GO TO RETURN (Step 7)

--- ANGLE A ACTUAL = ANG A ACT

--- ANGLE A DESIRED = ANG A DES

Calculate Sub

This sub-routine makes all computations for the desired angle A, B and C using the calculated "a" value (Position of each leg in "Y" axis) and "d" value (position of each leg along "X" axis) from the DELTA sub-routine.

1 - "CALC"

2 - IF d IS EQUAL TO 0 GO TO "MHH" (Step 5)

> The value of "d", like the value of "a" is relative to the leg number in the main loop. If this is the leg loop number 1 (leg 50) "d" will be "d1" and "a" will be "a1".

3 - MADE ANGLE C DESIRED EQUAL TO ARCTAN d/h; LET HH= h/COS C

4 - CREATE A NEW VARIABLE HHT EQUAL TO HH

5 - "MHH"   MOVE HH TO HHT

6 - MOV "a" DEISRED TO "at"   The "T" or "t" stand for temporary. Those values are stored in a temporary register.

7 - DIVIDE "at" BETWEEN "HHT"

8 - FIND THE ARCTAN OR STEP 7

9 - STORE IT AS ANGLE "CC"

10 - FIND COSINE ANGLE CC    This result is going to be called COS CC.

11 - DIVIDE HH BETWEEN COS CC

This result will be called "b"

12 - ROTATE RIGHT    This result will be called "b/2"

13 - DIVIDE "b/2" BETWEEN "c"

The small letter "c" is the half distance of a full extended leg or a half leg.

14 - FIND ARC COSINE OF STEP 13

15 - STORE STEP 14 AS ANGLE D

16 - SUBTRACT ANGLE D FROM $\frac{\pi}{2}$

17 - STORE IT AS ANGLE A/2

18 - IF DESIRED DISTANCE a NEGATIVE GO TO "A2PCC" (Step 22)

19 - SUBTRACT STEP 9 FROM STEP 17

This result will be angle B and will be equal to <A/2 - <CC.

20 - "ANGBN"    STORE THE PREVIOUS STEP EXECUTED AS ANGLE B

This step saves step 19 or step 22 as the new desired angle B.

21 - RETURN

22 - "A2PCC"    ADD STEP 9 AND STEP 17

In this case angle B will be equal to ⟩A/2 + ⟩CC. This is because the distance "a" is negative now.

23 - JUMP TO "ANGBN" (Step 20)

Leg Retrace Arbitration Sub

This sub-routine establishes the regress or retrace time for each leg, sets up the leg start position, checks if the leg is on the ground, avoids moving all legs from one side and/or all legs from the front and/or rear side to retrace at the same time and also avoids one leg hitting an adjacent leg in any of the operations. The last protection is necessary because one leg range could overlap the other.

1 - "RETRO"

2 - IF LEG 1 LOOP JUMP TO "T1" (Step 8)

3 - IF LEG 2 LOOP JUMP TO "T2"

4 - IF LEG 3 LOOP JUMP TO "T3"

5 - IF LEG 4 LOOP JUMP TO "T4"

6 - IF LEG 5 LOOP JUMP TO "T5"

7 - IF LEG 6 LOOP JUMP TO "T6"

8 - "T1" JUMP TO 9           Steps 8, 9 and 10 check if leg 4
                             and leg 2 are in RETRACE MODE
                             (RET FLAG SET) to avoid the vehicle
                             tipping over.

9 - IF LEG 4 IN RETRACE JUMP "EXIT"

10 - IF LEG 2 IN RETRACE JUMP TO "EXIT"

Steps 9 and 10 prevent leg 1
                             retrace flag until leg 4 and leg 2
                             finish their retrace action. This
                             is accomplished by jumping to exit
                             or return.

11 - SET RET 1 FLAG          This step changes leg 1 status to
                             retrace.

12 - IF HH IS NOT SMALLER THAN h/2 JUMP "SETHH"

13 - JUMP TO "REV14"

14 - "SETHH"                 SET HH EQUAL TO h/2

15 - RETURN

16 - "T4"                    JUMP 17 (Same as T1 but with
                             legs 1 and 5)

17 - IF LEG 1 IN RETRACE JUMP "EXIT"

18 - IF LEG 5 IN RETRACE JUMP "EXIT"

19 - SET LEG 4 RETRACE FLAG

20 - IF HH IS NOT SMALLER THAN h/2 JUMP "REV14"

21 - JUMP TO "SETHH" (Step 14)

22 - "T3"                          JUMP to 23

23 - IF LEG 6 IN RETRACE JUMP TO "EXIT"

24 - IF LEG 2 IN RETRACE JUMP TO "EXIT"

25 - SET LEG 3 RETRACE FLAG

26 - IF HH IS NOT SMALLER THAN h/2 JUMP "REV36"

27 - JUMP TO "SETHH" (Step 14)

28 - "T6"                          JUMP TO 29

29 - IF LEG 3 IN RETRACE JUMP "EXIT"

30 - IF LEG 5 IN RETRACE JUMP "EXIT"

31 - SET LEG 6 RETRACE FLAG

32 - IF HH IS NOT SMALLER THAN h/2 JUMP "REV36"

33 - JUMP TO "SETHH" (Step 14)

34 - "T5" JUMP TO 35

3/20/78

35 - IF LEG 4 IN RETRACE JUMP "EXIT"

36 - IF LEG 6 IN RETRACE JUMP "EXIT"

37 - SET LEG 5 RETRACE FLAG

38 - IF HH IS NOT SMALLER THAN h/2 JUMP "REV52"

39 - JUMP TO "SETHH" (Step 14)

40 - "T2" JUMP TO 42

41 - IF LEG 1 IN RETRACE JUMP "EXIT"

42 - IF LEG 3 IN RETRACE JUMP "EXIT"

43 - SET LEG 2 RETRACE FLAG

44 - IF HH IS NOT SMALLER THAN h/2 JUMP "REV52"

45 - JUMP TO "SETHH" (Step 14)

46 - "REV14"           IF REVERSE JUMP "AM014" (step 52)

47 - "AB036"           IF "A" BIGGER THAN 0 JUMP "AH6"
                       (Step 56)

48 - "A10"             SET A EQUAL 10 BITS

49 - "D0"              SET D EQUAL 0

50 - SET HH EQUAL h/4

51 - JUMP "EXIT"

52 - "AM014"                JUMP

53 - IF A MINOR  JUMP "AH2M6"

54 - "AM10"                 SET A EQUAL TO MINUS 10 BITS

55 - JUMP TO D0 (Step 51)

56 - "AH6"                  SET A EQUAL TO H MINUS 6 BITS

57 - "INCHH"                INCREMENT HH VALUE BY 1 BIT

58 - IF LEG SENSE GROUND SWITCH IS NOT ON JUMP "EXIT"

If the sense switch is activated

59 - RESET THE LEG RETRACE FLAG  before the retrace is finished
this routine will stop the vehicle.

There is a sense switch in each leg.

If the ground is sensed by the switch, the computer continues from step 58 to step 59 and reset the RETRACE FLAG. If not it jumps in step 58 to EXIT and waits to test the switch in the next leg loop cycle.

60 - SET h EQUAL TO HH

61 - JUMP "EXIT"

62 - "REV36"                JUMP 63

63 - IF THE UNIT IS IN REVERSE JUMP "AB036" (Step 47)

64 - IF A IS NOT LESS THAN 0 JUMP TO "A10"

65 - SET AN EQUAL TO 50 MINUS An minus 1 BIT

This sets the brake start point but before setting the value of

An (n=1, 2 ... 6) it subtracts the value of the previous leg

An-1 in order to avoid one leg hitting or knocking the other.

48 is the distance in inches between two adjacent legs. I use 50 inches (or bits) in order to leave 2 inches of clearance.

66 - JUMP TO "INCHH"

67 - "AH2M6"                    JUMP TO 68

68 - SET A EQUAL TO h/2 MINUS 6 BITS

69 - JUMP TO "INCHH" (Step 57)

70 - "REV52"

71 - "REV52"                    JUMP TO STEP 72

72 - IF NOT REVERSE JUMP TO "AM052"

73 - IF A NOT GREATER THAN 0 JUMP TO "A10"

74 - SET An EQUAL TO 50 MINUS An plus 1 BIT

Same function as step 65

75 - "AMAXH2"                   JUMP TO STEP 76

76 - IF A IS NOT BIGGER THAN h/2 JUMP TO "INCHH"

77 - SET A EQUAL TO h/2

78 - JUMP TO "INCHH"

79 - "AM052"                    JUMP TO STEP 80

80 - IF A NOT LESS THAN 0 JUMP "AM10"

81 - SET An EQUAL TO A(n-1) MINUS 50 BITS

82 - JUMP TO "AMAXH2" (Step 75)

83 - "EXIT"                     RETURN

DELTA

This sub-routine reads the desired rate of change of "a" or "Y" axis speed and stores it in memory, then it adjusts the value of "a" for each and every leg. This information is used by the "CALC" sub-routine to generate the corresponding angles A and B once the "HH" value is calculated.

This sub-routine also does the same with value "d" for sideward (lateral) displacement (See Figure 3) of the unit or a combination of "a" and "d" for turning and steering. There are two basic types of steering or turning. One uses standard combination of "a" and "d" in relation to the steering ratio (delta "S"). The other calculates "d" values and "a adjustment" values based on the formula: $R^2 = X^2 + Y^2$ (See Figure 4).

R = the radius from the center CT to the corner legs 40, 46, 44 and 50.

X = the distance from CT to the side legs 42 and 48.

Y = the distance from the side legs 42 and 48 to the end legs 40 and 44; and 46 and 50 respectively.

This other turning is uniquely adapted for digging a precision trench parallel to the horizon to store water in a mountain slope. The unit is turned using the average "h" as a reference. If we keep the "h" constant (especially the front legs) the unit will follow the mountain contour and will dig or plow parallel ditches or trenches with the horizon.

1 - "DELTA"  READ DESIRED SPEED

This is the value delta "a" that is read from the control stick 20 displacement. Positive means forward and negative, reverse.

2 - IF DELTA "a" EQUALS 0 JUMP TO "LEESTE"

3 - IF NN EQUAL 1 JUMP TO "DELAMO"

4 - IF NN EQUAL 4 JUMP TO "DELAMO"

5 - IF DELTA "a" IS NOT    THAN 0 JUMP "AMAY10"

6 - "DAMA10"    JUMP TO STEP 7

7 - IF DELTA 'a' GREATER THAN 10 BITS JUMP AD10A

8 - ADD DELTA "a" TO THE ACTUAL VALUE OF a

9 - "HKEEP1"    STORE THE NEW "a" VALUE

10 - JUMP TO "LEESTE"

11 - "AD10A    ADD 10 BITS TO a

This is a speed limit step. If the desired rate of change of delta "a" is greater than 10 unit per leg cycle, this step limits it to 10 unit.

12 - JUMP TO "HKEEP1"

13 - "DELAM0"          JUMP TO STEP 14

14 - IF DELTA "a" GREATER THAN 0 JUMP TO "AMAY10"

15 - JUMP TO "DAMA10"

16 - "AMAY10"          JUMP TO STEP 17

17 - IF ABS DELTA "a" BIGGER THAN 10 BITS JUMP "SU10A"

18 - SUBTRACT DELTA "a" FROM a

19 - JUMP "HKEEP1"

20 - "SU10A"           SUBTRACT 10 BITS FROM a

21 - JUMP "HKEEP1"

22 - "LEESTE"          JUMP TO STEP 23

23 - IF "S" EQUAL 0 JUMP TO "DELD"

If "S" is equal to 0 it means that no steering or turn around a point is desired.

24 - IF PRECISION DITCHING IS NOT SET GO "SMA0" - CONTROL STEERING SUCH THAT AVERAGE HEIGHT IS CONSTANT

This routine is executed when an I/O PORT with DITCH signal is on. This routine corrects the steering until the "h" average is constant. The net effect is that the unit will follow the terrain contour digging parallel trenches to the horizon.

25 - MODIFY "a" AND "d" FOLLOWING THIS FORMULA: $R^2 = X^2 + Y^2$

The values of Y in this step will be the following:

Y1 and Y4 = -(50 bits + a)

Y2 and Y5 = a

Y3 and Y6 = 50 bits + a 50 is used in lieu of 48 to allow the two inch clearance.

Y1 = leg 50, Y2 = leg 48, Y3 = leg 46, Y4 = leg 44, Y5 = leg 42, and Y6 = leg 40.

26 - LET THE VALUE OF X BE CHANGED BY "X" PLUS DELTA "S"

27 - MODIFY THE VALUE OF "Y" USING "R" AND THE NEW "X"

$$Y = R^2 - X^2$$

28 - JUMP TO DELD

29 - "SMA0"   JUMP TO STEP 30

This routine assigns values to An (n = 1, 2 ...6) and dn using a table of approximation assuming a unit with a dimension of 4 feet by 8 feet.

30 - IF " S" BIGGER THAN 0 GO "RIGHT" (Step 42)

31 - "LEFT"   LET $a_1 = a_1 + S$

32 - LET $d_1 = d_1 + 2S$

33 - LET $a_2 = a_2 - S$

34 - LET $a_3 + a_3 - S$

35 - LET $d_3 = d_3 - 2S$

36 - LET $a_4 = a_4 - S$

37 - LET $d_4 = d_4 + 2S$

38 - LET $a_5 = a_5 + S$

39 - LET $a_6 = a_6 + S$

40 - LET $d_6 = d_6 - 2S$

All formulas above are logical formulas not algebraic (from Step 31 to 40).

41 - JUMP TO "DELD"

42 - "RIGHT"   LET $a_1 = a_1 - S$

43 - LET $d_1 = d_1 - 2S$

44 - LET $a_2 = a_2 + S$

45 - LET $a_3 = a_3 + S$

46 - LET $d_3 = d_3 + 2S$

47 - LET $a_4 = a_4 + S$

48 - LET $d_4 = d_4 - 2S$

49 - LET $a_5 = a_5 - S$

50 - LET $a_6 = a_6 - S$

51 - LET $d_6 = d_6 + 2S$ (All formulas are logical not algebraic)

52 - JUMP TO DELD

53 - "DELD"    JUMP TO 54

54 - IF DELD EQUAL 0 JUMP TO "OUT3"

This is the desired "delta d" or side displacement. If we want to move sidewards the control stick 20 is moved sidewards and it moves the position sensor that sends a signal to the A/D converter in the computer that feeds this information and changes the value of "d" in order to perform side motion.

55 - ADD DELTA "d" to d

If it is positive, the legs are displaced to the left or negative side and the unit move sideward to the right.

56 - "OUT3"    RETURN

Leg Movement Formulas

Figure 9:
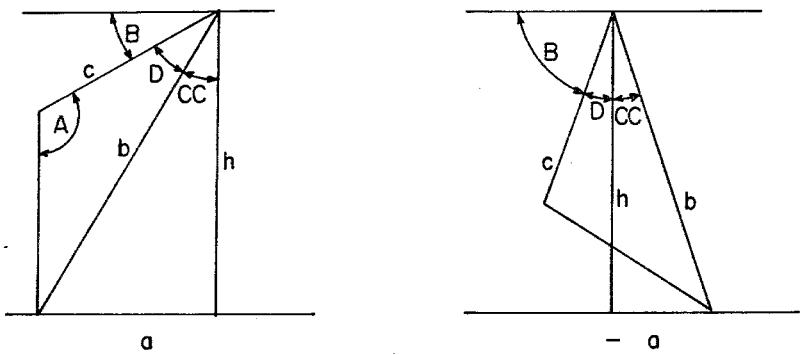
FIG. 9 is a graphic representation of the angles derived from the articulated leg positions formulated in determining the leg movement formulas.
Figure 10A:
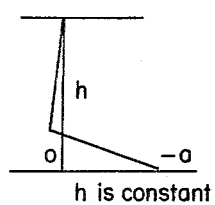
Figure 10A:
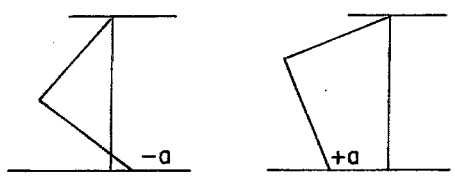

The following formulas in combination with the graphical representations of Figures 9 and 10 illustrate the basis of the functioning of the articulated legs of the invention.

1. When a > 0

$$\angle cc = \text{Arctan}\ \frac{a}{h}$$

$$b = \frac{h}{\cos cc}$$

$$\angle D = \text{ArcCos}\ \frac{b/2}{c} = \cancel{\text{ArcCos}\ \frac{b/2}{c}}$$

$$\frac{A}{2} = \frac{\pi}{2} - \angle D$$

$$\frac{\pi}{2} = \angle B + \angle CC + \angle D$$

$$\angle B = \frac{\pi}{2} - \angle D - \angle CC$$

$$\angle B = \angle \frac{A}{2} - \angle CC$$

2. When a < 0

$$\angle CC = \text{Arctan}\ \frac{a}{h}$$

$$b = \frac{h}{\cos CC}$$

$$\angle D = \text{ArcCos}\ \frac{b/2}{c}$$

Leg Movement Formulas

The following formulas in combination with the graphical representations of FIGS. 9 and 10 illustrate the basis of the functioning of the articulated legs of the invention.

1. When a > 0

$\angle cc = \text{Arctan}\ a_h$ $b = h/\cos cc$ $\angle D = \text{ArcCos}\ (b/2)/c$ $\angle A/2 = \pi/2 - \angle D$ $\pi/2 = \angle B + \angle CC + \angle D$ $\angle B = \pi/2 - \angle D - \angle CC$ $\angle B = \angle A/2 - \angle CC$ 2. When a < 0

$\angle CC = \text{Arctan}\ (a/h)$ $b = h/\cos CC$ $\angle D = \text{ArcCos}(b/2/c)$ $\angle A/2 = \angle/2 - \angle D$ $\angle B = \pi/2 - (\angle D - \angle CC)$ $\angle B = \pi/2 - \angle D + \angle CC$ $\angle B = \angle A/2 + \angle CC$ The limit of any leg movement is illustrated in FIGS. 10a and 10b and the tables set forth below.

| Table for the Retrace or Regress Limit of the Legs | | | | |
|---|---|---|---|---|
| | Machine Forward Movement | | Machine Reverse Movement | |
| | legs 2,3,5,6 | legs 1,4 | legs 2,3,5,6 | legs 1,4 |
| Retrace start when $\rightarrow$ | $[a_n] > h_n$ | $[a_n] > \frac{h_n}{2}$ | $[a_n] > \frac{h_n}{2}$ | $[a_n] > h_n$ |
| Then legs are set to $\rightarrow$ | $[a_n] = \frac{+h_n}{2}$ | $[a_n] = h_n$ | $[a_n] = h_n$ | $[a_n] = \frac{h_n}{2}$ |

By incrementing values of a ($a = a + \Delta a$) and keeping delta a/t (time) constant we create constant speed. The input into the computer 200 as described generates values of angle A or angle A/2 and angle B for each new value of "a". The value of h is determined by the desired height, the vehicle balance and the control wheel 18. If the ground is flat all "h" are the same. If the ground is irregular then there will be different values of "h" for each of the legs. (Sub. "SETH", Sec. B, Steps 1 to 33)

The "h" value for any leg is kept constant during each trace. In the description of the operation of the invention only certain movements of the machine will be described in detail for illustrative purposes. It will be apparent to those skilled in the art based on the description of the structure and function of the vehicle together with the programs provided that an almost infinitesimal amount of various movements are possible.

In this example the movements described in detail will consist of vehicle balance and moving forward on a flat surface, turning around a point and steering; moving across a mountain slope, leg adjusting to obstacles; and braking and backward and side motion.

Vehicle Balance and Moving on A Flat Surface

The vehicle is four feet in width, eight feet long and with the legs fully extended the bottom surface of the platform is sixty inches from the surface.

The computer 200 is initialized and the engine 22 started and the fluid pump 24 raised to the appropriate pressure.

The computer 200 checks the sensors 388 and 390 of the gimbal-pendulum 60 to determine if the vehicle 10 is balanced, program steps 2, 3, 12 in sub-routine SET h. For example, if the vehicle 10 is tilted about the Y axis as shown in FIG. 3 (angle R>0) legs 40, 42 and 44 are lower than legs 46, 48 and 50. The "h" height of each leg is then analyzed by the computer 200 and is balanced changing h4, h6 for legs 40, 44, in sub-routine SET h Steps 4–6.

Figure 6:
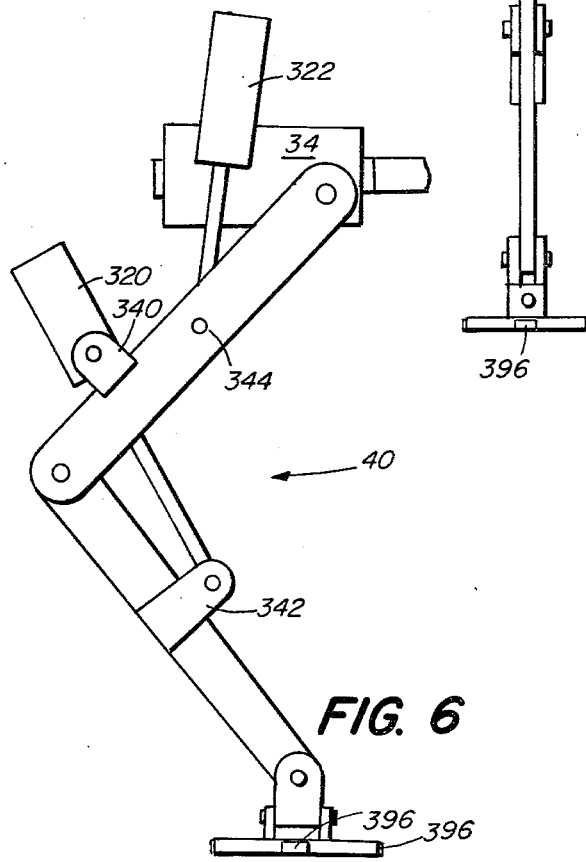
FIG. 6 is a side view of the leg of FIG. 5.

Each leg has pressure-sensitive ground switches which output a signal when the leg contacts either an obstacle or the ground. The sense switches 396 for leg 40 are shown in FIGS. 5 and 6.

As is apparent from the sub-routine SET h when the vehicle 10 is balanced only the four corner legs 40, 44, 46 and 50 are initially controlled. The computer determines which legs should be raised or lowered based on the present leg height h and the distance of the leg loop. When balance is achieved the signals from the sense switches of the two middle legs 42 and 48 are checked to determine whether or not they are in contact with ground; if not they are extended until they contact ground and balance is complete. (SET h, steps 13–17)

In order to increase or decrease the height of each of the legs the computer controls the angle A and angle B values of each leg. These angles are calculated based on the desired height (actual h plus a change in $h = h + \Delta h$) and the actual value of "a". Referring to FIG. 5, for leg 40, the sensors 360 ($\angle A$) and 362 ($\angle B$) provide signals to the computer 200. The computer determines the amount of movement of each of the legs. For leg 40 outputs to the solenoid valves 314 and 316 are sent and the corresponding cylinders 320 and 322 are actuated. This sequence of calculations the desired angles, measuring the actual angles and actuating the associated cylinders to move the legs to the calculated values is done for each leg. The solenoid valves on the left side of the vehicle 10 referring to FIG. 3 are opened and the valves of the right side referring to FIG. 3 are closed until the actual angle A's and angle B's are equal to the calculated angles. At this point we have the desired height equal to the actual height. These steps are repeated for each and every leg until balance is achieved. Where the vehicle 10 is tilted around the X axis (angle P>0) legs 46 and 40 are increased (SUB-ROUTINE SETH Step 29) and legs 44 and 50 are decreased (SUB-ROUTINE SETH Step 32) until balance is achieved using the same h concept. Again the corner legs are moved to achieve the desired balance. Subsequently the side legs are actuated to engage the ground to stabilize the vehicle.

Moving On A Surface

Once balance is achieved the vehicle 10 is ready to move. The operator moves the control stick 20. Movement of the stick 20 changes the position of the sensing device 21 (FIG. 8b). The device 21 has two sensors as previously described. If the operator moves the control stick forward the machine will move forward at a speed specified by the amount of stick forward movement. When the operator desires to stop he moves the control stick backward to a center (neutral) position. If the operator wants to move sideward he moves the control stick sidewards.

The computer 200 will increase the value of "a" for each leg according to the amount of movement of the control stick 20 (SUB-ROUTINE "DELTA" Steps 8, 18). This increment of "a" will be constant as far as the stick 20 is offset from its neutral position. If the rate of change of "a" is constant per unit of time then the speed will be constant. The distance "a" is shown in FIGS. 10a and 10b. For each increment of the distance "a" in each leg, the computer will calculate angle A and angle B using formulas I and II set forth above (SUB-ROUTINE CALC SEC. E Steps 1 to 23).

The leg height h is going to be constant during the forward or trace cycle. This value h will change only at the beginning of the retract cycle and at the beginning of the next leg cycle when the leg is going to be adjusted to a new location on the ground and the balance is checked again. It is to be understood that during the trace cycle the foot of the leg remains fixed on the ground while the vehicle moves. This may be seen in FIGS. 11–14.

Turning On A Flat And An Irregular Surface

To turn around its center on or about the Z axis, referring to FIG. 3, the control wheel 18 is turned. Each leg will move around a circle with its radius equal to the distance between CT and the position of the leg at the time turning is commenced. The computer selects the values of "d" and "a" for each leg such that the net effect will be to turn the vehicle around CT (SUB-ROUTINE DELTA Steps 29 to 51). The radius R is calculated at the leg start movement for each and every leg for precision turning. The leg displacement is going to be controlled by $X^2 + Y^2 = R^2$ when $Y = a_n$ ($a_n$ is the actual leg "a" value plus the distance from "X" axis) for each leg or for n=1, 2 ... 6. The control wheel 18 is connected to a shaft at the end of which is the wheel position sensing device 19. Change in position of the optical encoder generates a corresponding change in electrical signal (1 RADIAN=57.3°=128D=2.56 volt DC 1 turn/sec) which is input to the computer 200. In this way the computer determines the desired turning ratio (1/128 turn sec per bit) and now has the desired ratio to control the leg movement. The computer 200 calculates the corresponding values of X and Y. If the vehicle 10 is moving and turning at the same time the value of "Y" corresponding to the turn ratio is incremented by delta a (change in a) corresponding to the forward or backward movement. The displacements along the X axis (FIG. 4) are going to be achieved by changing the $\angle C$ corresponding to each leg when turning and moving either forward or backward. Sideward or lateral movement is achieved by changing angle C ($\angle C$) with respect to time in a similar way as "a" is changed with respect to time (ROUTINE DELTA Steps 53 to 55).

Moving Across A Sloped Surface

When a=0 and h is constant then there are no changes of a in time and the machine clearly does not move. As soon as "a" by movement of the stick 20 is incremented ($a_{n+1} = a_n + \Delta a$) which essentially means a new value for "a", the old values of angle A and angle B are calculated and the actual angle A and angle B are changed to the calculated values and the net result is forward movement.

Figure 15:
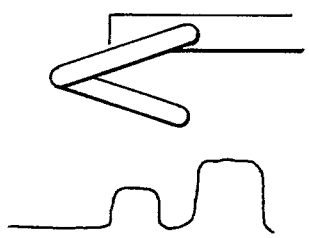
Figure 16:
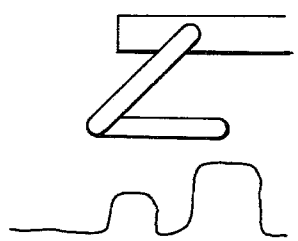
Figure 17:
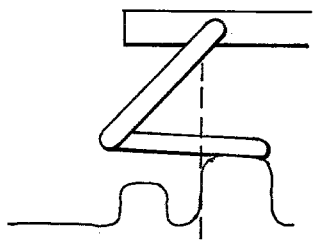
Figure 18:
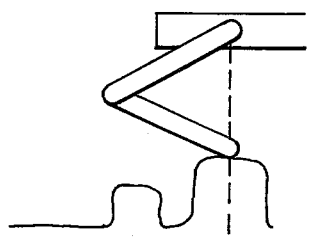
Figure 19:
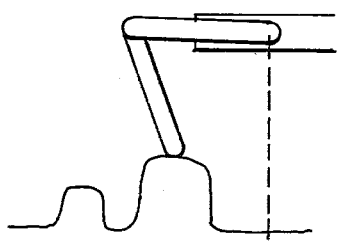

When a reaches the established limit ("a" value for the leg in relation to its "h" value) the retract sequence starts (See RETRACT LIMIT TABLE). The value of h is reduced, the computer checks to determine if there are other legs in the retract mode at the same time before starting retrace in leg 40, for example (SUB-ROUTINE RETRO Steps 7, 28 to 30, for leg 40). The value of h is reduced to a preset value specifically h/4 (SUB-ROUTINE RETRO Step 52) then the leg synchronization routine (RETRO Step 1 to 50) sets the time when the next leg trace should start. The value of "a" is reduced to the preset value according to the retrace limit table. When the trace starts values of "a" are incremented again, values of "a" are incremented at the same time as the other machine legs are, in order to allow this leg to be moving at machine speed when it engages the ground. Ground is detected when the ground sense switch is closed (SUB. RETRO Steps 58 and 59). Now values of "h" start to be incremented until the gimbal-pendulum sensor 60 feels an unbalance (this feature allows the leg to be adjusted to the terrain). Any obstacle is cleared because the leg height is divided by 4 during retract (FIGS. 15 and 16). If there is an obstacle the leg is going to be adjusted to it if it has not been cleared in the retrace mode (FIGS. 17 and 18).

When the vehicle 10 is moving across a mountain slope the legs of both sides are going to be adjusted until balance is achieved. Any obstacle will be handled in the same way. If the obstacle is too big to be cleared the vehicle will stop indicating that the leg cannot clear the obstacle.

If a leg through its retract (loop) cannot clear the obstacle then the sense switch such as 396, leg 40, will be actuated when it hits the obstacle before the leg has completed its maximum retract (SUB-ROUTINE RETRO Step 58).

This will place the vehicle in a hold position and the operator must then move in a different direction to avoid the obstacle which cannot be overcome (SUB-ROUTINE RETRO Step 58).

Leg Adjustment To Obstacles

Figure 11:
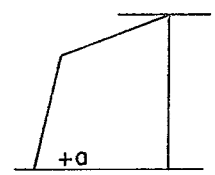
FIGS. 11 through 19 are pictorial representations used to illustrate the operation of the invention; and, FIG. 20 is a functional block diagram of input-output to the computer.
Figure 11:
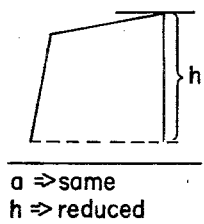
Figure 11:
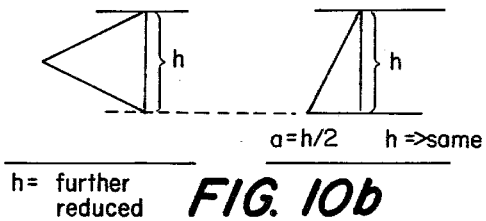
Figure 11:
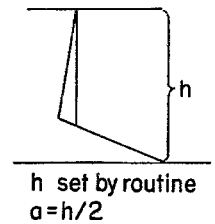
Figure 11:
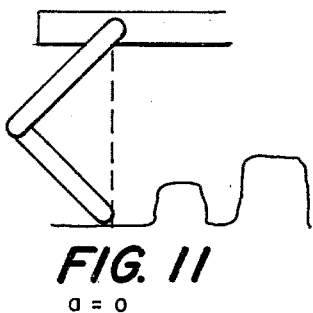
Figure 12:
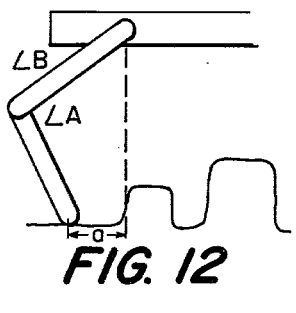
Figure 13:
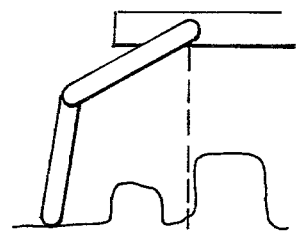

The angles A and B in each leg are adjusted based on the value of "a" and the value of "h". Once established the value of "h" is kept constant during trace while the value of "a" is going to change with time. Referring to FIG. 11, "a"=0. As the vehicle moves forward, FIG. 12, "a" increases. When the value of "a" is equal to a preset value measured in terms of the h and conditioned to the position of the other legs, to avoid one hitting the other (For LEG 40 IN FORWARD, RETRO Step 67) all retracing at the same time (Example: SUB-ROUTINE RETRO Steps 7, 29 to 30 prevent Leg 40 retrace at the same time as leg 42 or 44 is retracting), or any other desirable condition, the leg starts the retrace action as shown in FIG. 13.

Figure 14:
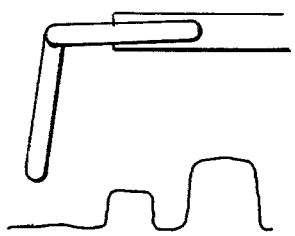

Initially the value of "h" is decreased, FIG. 14. Then the value of "a" is decreased to the preset value, FIGS. 15 and 16. Decreasing h while "a" is changing allows the leg to be moving at the vehicle's speed at lift-off time.

After checking the leg synchronization computer routine (for the forward cycle start time) the leg starts the forward motion increasing h until an imbalance is sensed due to this leg movement, FIG. 17. The leg h value is fixed by the computer until the leg will start the retrace cycle again. The forward movement continues. The first obstacle has been cleared and the leg adjusted to the next obstacle as shown in FIG. 18. Now the leg is ready to commence the retrace "a" and having established the retraced relation with "h". The h value for this leg will be smaller in this case due to the obstacle. In case of a slope or an obstacle each leg is adjusted individually until balance is achieved.

Braking Backward Motion, Sideward Motion and Bank Effect

If the vehicle 10 is moving forward at constant speed then "delta a"/"delta t" is constant (rate of change of "a" is constant with time because "a" is distance).

$$ds/dt = v$$

$$d^2s/dt^2 = dv = A$$

$$s = \int v \, dt$$

s = distance = a
v = velocity
A = acceleration

If we reduce the rate of change of "a" with respect to time, deceleration or braking will result. If "a" increases 10 units per second the machine is moving 10 units per second when the stick 20 is moved closed to the neutral position, and the level of this signal is two units per second the computer senses the change in position and "a" is reduced by 2 units every second wherein the machine will brake in 5 seconds. When the machine is braking the gimbal-pendulum arrangement 60 moves forward then the computer senses this movement and maintains the balance of the vehicle in reference to the pendulum. The computer will increase h1 (leg 50), h4 (leg 44) and decrease h3 (leg 48), h6 (leg 40) in order to maintain the balance. The net result will be the front is higher than the back while braking.

Backward Motion

The concepts that apply to forward motion equally apply to reverse motion but with opposite signs. In reverse when the control stick 20 is pulled rearwardly from the neutral position and sensed by the computer, the legs start their trace at the opposite point of forward. The value of "a" decrements with time instead of increments. The leg regress or retrace starts at the same point as with the leg start trace in the forward motion.

Side Motion

In sideward movement angle C is changed with time (delta "d"/time) until its limit (MAIN PROGRAM Step 6) is reached then h is decreased as before and the retract cycle starts. The angle C is changed to the other extreme—C and h starts to increase until balance is achieved. The HH value (the real leg length) will be equal to h/cos C. The "h" value will be constant but HH will be a sinusoidal function of C. This is set forth in the program identified as "CALC" steps 2 and 3. Sideward acceleration will affect the gimbal-pendulum 60 and the computer will adjust the vehicle to it in the same manner as when turning.

For example the control stick 21 is moved 12 degrees sideward (approximately 1/5 Radian), the sensor sends a 500 mv signal that is changed to 25 decimal in the computer 200. If an optical encoder is used it will send the 25 decimal or 31 octal signal directly to computer interface (SUB-ROUTINE DELTA Step 54). This is the "delta d" value and it is added to "d" (SUB. DELTA Step 55). The angle C necessary for this new value of "d" will be equal to ARCTAN d/h ("CALC" Step 3). Once the angle C is calculated based on "d" and "h" we are ready to control Routine CONTROL STEPS 1 to 11. The solenoids that control ∠C for each leg (in sequence are actuated) such that angle C desired will be equal to angle C actual as determined from the leg sensors. The control sub-routine for angle A for all legs has been detailed. The same routine format is used for all angle B and all angle C of all legs.

Having described my invention what I now claim is:

1. A vehicle particularly for movement over a non-uniform surface which comprises:
    (a) a housing through which a longitudinal axis Y, a transverse axis X and a vertical axis Z pass the axes being mutually perpendicular, one to the other, the horizontal plane of the vehicle being parallel with the X and Y axes when the vehicle is balanced;
    (b) a plurality of articulated legs secured to and extending downwardly from said housing, each of the legs comprising at least two links, an upper link and a lower link,
        the upper link pivotally joined to the housing at one end and pivotally joined at its other end to the upper end of the lower link, the longitudinal axes of the links intersecting and defining an angle,
        drive means secured to the legs to effect movement of the links through angle A and movement of the upper link through angles B and C; one side of the angle B coincident with the longitudinal axis of the upper link and the other side parallel to the X axis, one side of the angle C coincident with the longitudinal axis of upper link the other side parallel to the Y axis, the movement through the angles B and C resulting in a substantially cone-shaped region, the apex of the cone being at the one end of the upper link;
    (c) angle sensors to monitor the angles of each of the legs and to provide outputs corresponding to the same;
    (d) a level sensor to monitor the horizontal plane of the vehicle in reference to the X and Y axes and to provide outputs corresponding to the position of the housing in relation to the X and Y axes;
    (e) control means secured to the vehicle to effect forward, rearward, sideward and rotary motion of the vehicle, said control means providing signals which result in the movement of the legs;
    (f) a power source secured to the housing and in communication with the drive means and responsive to a computer; and,
    (g) a computer secured to the housing and responsive to the signals from the angle sensors, level sensor and the control means, the computer in communication with the power source and the drive means which computer through the control means effects the desired movement of the legs in response to the signals from the control means and level sensor.

2. The vehicle of claim 1 wherein the housing comprises a platform of a substantially rectangular shape and further which includes six articulated legs, four disposed at the corners of the platform and one each at the sides of the platform intermediate the corners.

3. The vehicle of claim 2 wherein the drive means includes hydraulic cylinders secured to the platform and to the links to effect movement of the leg through the angles B and C and movement of the links through angle A.

4. The vehicle of claim 2 wherein the control means includes a control wheel to output signals for effecting rotary movement of the vehicle about the Z axis and a control stick to output signals which effects movement of the vehicle along the X and Y axes.

5. The vehicle of claim 4 which includes means to combine the output signals of both the control wheel and the control stick to effect a turning movement of the vehicle.

6. The vehicle of claim 4 wherein the control stick includes means to effect forward and rearward movement along the X axis.

7. The vehicle of claim 4 wherein the control stick includes means to effect sideward movement along the Y axis.

8. The vehicle of claims 3, 4, 5, 6 or 7 which includes six legs secured to the housing, the drive means includes hydraulic cylinders secured to the upper and lower links to effect movement of the links through the angle A and hydraulic cylinders secured to the housing and upper links to effect movement of the links through the angles B and C.

9. The vehicle of claim 8 wherein the level sensor includes a gimbal-pendulum device to monitor the balance of the vehicle.

10. The vehicle of claim 8 which includes:
    means to effect movement of the legs through trace and retrace cycles, movement of the leg through the trace cycle to maintain the vertical height (h) between the one end of the upper link with reference to the other end of the lower link of the leg constant while changing the relative horizontal positions between the one end of the upper link and the other end of the lower link; and the retrace cycle to move the leg by changing the vertical distance between the other end of the lower link and the one end of the upper link (h) and the horizontal distance between the one end of the upper link and the lower end of the lower link (a).

11. The vehicle of claim 10 which includes:
    sensors secured to the end of the lower link of each of the legs, said sensors in communication with the computer and adapted to provide a signal when the sensor engages a surface.

12. The vehicle of claim 10 which includes:
    means to control sequentially the movement of the links to balance the vehicle.

13. The vehicle of claims 12 which includes:
    means to control the movement of the links of the corner legs sequentially and to adjust subsequently the height (h) of the links of the side legs to engage the surface to stabilize the vehicle after the vehicle has been balanced.

14. The vehicle of claim 1 which includes:

means responsive to the level sensor to maintain the vehicle balance when moving substantially forward across a sloped surface, the plane of the vehicle when balanced in non-parallel relationship with said sloped surface.

15. A method of moving a vehicle, particularly over a non-uniform surface, which vehicle comprises a housing through which a longitudinal axis Y, a transverse axis X, and a vertical axis Z pass, the axes being mutually perpendicular one to the other, the horizontal plane of the housing being parallel with the X and Y axes; the vehicle further including six articulated legs secured to and extending downwardly from the housing, the legs comprising an upper link pivotally joined to the housing at one end and pivotally joined to the housing at one end and pivotally joined at its other end to the upper end of the lower link, the longitudinal axes of the links intersecting and defining an angle A, the legs further adapted for movement through angles B and C; one side of the angle B coincident with the longitudinal axis of the upper link and the other side parallel to the X axis, one side of the angle C coincident with the longitudinal axis of the upper link, the other side parallel to the Y axis, the movement through said angles B and C resulting in a substantially cone-shaped region, the apex of the cone being at the one end of the upper link, and wherein the six legs comprise four corner legs and two side legs which method comprises:

sensing the balance of the vehicle in respect to the X and Y axes;

providing an output to a computer corresponding to the position of the horizontal plane of the housing in reference to said axes, the computer determining if the housing is offset from either of said axes;

sensing sequentially the angular position of each leg and transmitting the position of each leg to the computer;

providing an output from the computer to the legs;

controlling the movement of at least one of the links of one of the four corner legs to balance the housing;

controlling subsequently the height of at least one of the side legs to stabilize the vehicle; and controlling the movement of the vehicle, in reference to one of the X, Y or Z axes.

16. The method of claim 15 wherein the vehicle comprises six legs and control means to effectuate movement about at least one of the axes, X, Y or Z which includes balancing the vehicle prior to and subsequent to each command signal from the control means.

17. The method of claim 16 which includes moving the vehicle along the X axis;

moving laterally four of the six legs through a trace cycle wherein the vertical height (h) of the legs remains constant while moving laterally the remaining two legs through a retrace cycle where the vertical height (h) varies.

18. The method of claim 15 which includes moving the vehicle along the X and Y axes by moving a control stick to provide a command signal to the computer which movement of the control stick corresponds to the desired direction of movement outputting a signal from the computer to at least one of said legs to effect the desired movement.

19. The method of claim 18 which includes moving the vehicle forwardly along the Y axis by moving the leg through at least one of the angles A and B.

20. The method of claim 18 which includes moving the vehicle rearwardly along the Y axis by moving the leg through at least one of the angles A and B.

21. The method of claim 15 which includes moving a control stick which provides a command signal to the computer which movement of the control stick corresponds to the desired direction of movement;

moving the vehicle along the Y axis at least one of said legs moving through the angle C.

22. The method of claims 15, 16, 17, 18, 19, 20 or 21 wherein the vehicle includes a control wheel to effect rotary movement about the Z axis which includes providing a command signal to the computer from the control means to effect movement along the X axis and controlling the movement of the links through angles A, B and C to effect said rotary movement.

23. The method of claim 22 which includes combining the command signals from the control wheel and the control stick to effect a turning movement of the vehicle.

24. The method of claim 15 which includes moving the vehicle substantially along the y axis across a sloped surface, the plane of the vehicle when balanced in non-parallel relationship with said sloped surface, and maintaining the vehicle level through said forward movement.

* * * * *